United States Patent
Akuta et al.

(10) Patent No.: US 8,046,133 B2
(45) Date of Patent: Oct. 25, 2011

(54) STEERING APPARATUS

(75) Inventors: Yoshimitsu Akuta, Wako (JP);
Shunsuke Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 933 days.

(21) Appl. No.: 12/026,270

(22) Filed: Feb. 5, 2008

(65) Prior Publication Data

US 2008/0201040 A1  Aug. 21, 2008

(30) Foreign Application Priority Data

Feb. 16, 2007  (JP) .................................. 2007-036675

(51) Int. Cl.
*B62D 6/00* (2006.01)
*B62D 5/04* (2006.01)
*B62D 117/00* (2006.01)

(52) U.S. Cl. .......................................... 701/42; 180/446

(58) Field of Classification Search ....................... 701/41
See application file for complete search history.

(56) References Cited

U.S. PATENT DOCUMENTS

| | | | | |
|---|---|---|---|---|
| 2,973,658 A * | 3/1961 | Bishop | ............................. | 91/382 |
| 5,048,629 A * | 9/1991 | Abe et al. | ....................... | 180/412 |
| 5,181,173 A * | 1/1993 | Avitan | ............................. | 701/42 |
| 5,205,371 A * | 4/1993 | Karnopp | ....................... | 180/444 |
| 6,173,221 B1 * | 1/2001 | Boehringen et al. | ............ | 701/41 |
| 6,178,365 B1 * | 1/2001 | Kawagoe et al. | ................ | 701/41 |
| 6,705,420 B2 * | 3/2004 | Ono et al. | ....................... | 180/407 |
| 6,915,194 B2 * | 7/2005 | Kodama et al. | .................. | 701/41 |
| 7,004,281 B2 * | 2/2006 | Hidaka | ........................... | 180/446 |
| 7,065,436 B2 * | 6/2006 | Hara | ................................. | 701/41 |
| 7,392,878 B2 * | 7/2008 | Ono et al. | ........................ | 180/421 |
| 2006/0000663 A1 * | 1/2006 | Takimoto et al. | .............. | 180/446 |
| 2006/0006020 A1 * | 1/2006 | Ono et al. | ........................ | 180/446 |

FOREIGN PATENT DOCUMENTS

JP  2000-344120 A  12/2000
JP  3344474 B2  8/2002

* cited by examiner

*Primary Examiner* — Shelley Chen
(74) *Attorney, Agent, or Firm* — Arent Fox LLP

(57) ABSTRACT

This steering apparatus is capable of changing and controlling a ratio of a turning angle of a steered wheel to an operation amount of an operation member, wherein the ratio is reduced when an operation speed of the operation member is higher than a predetermined operation speed; and if the operation speed is reduced thereafter, then the reduced ratio is maintained.

6 Claims, 4 Drawing Sheets

STEERING APPARATUS

BACKGROUND OF THE INVENTION

Priority is claimed on Japanese Patent Application No. 2007-036675, filed Feb. 16, 2007, the contents of which are incorporated herein by reference.

FIELD OF THE INVENTION

The present invention relates to a steering apparatus.

DESCRIPTION OF THE RELATED ART

In a steering apparatus of what is called a steer-by-wire type in which an operation unit that is operated by a driver and a steering unit that steers steered wheels are mechanically unconnected, it is possible to change and control a ratio of a wheel turning angle of the steered wheels to the steering angle of a handle.

In addition, a steering apparatus is known which has an operation unit and a steering unit that are mechanically unconnected, is capable of changing and controlling a ratio of a wheel turning angle of wheels to a steering angle of a handle, and reduces the ratio when the vehicle speed is low and an operation speed of the handle by a driver is relatively high (for example, refer to Japanese Granted Patent, Publication No. 3,344,474). With this configuration, it is possible to suppress reduction in a steering follow-up performance that easily occurs in the low vehicle speed and the high operation speed.

However, in the invention disclosed in Japanese Granted Patent, Publication No. 3,344,474, the control is performed such that the ratio is immediately increased when the operation speed is reduced after the ratio is reduced in accordance with increasing the operation speed of the handle; therefore, there has been a problem in that an operation feeling may be deteriorated due to the changing ratio.

In view of the above-mentioned circumstances, the present invention has an object of providing a steering apparatus which can further improve an operation feeling in a steering apparatus that can change and control a ratio of a wheel turning angle of wheels to an operation amount of an operation member.

SUMMARY OF THE INVENTION

The present invention employed the followings in order to achieve the above-mentioned object.

The present invention employs a steering apparatus which is capable of changing and controlling a ratio of a turning angle of a steered wheel to an operation amount of an operation member, wherein the ratio is reduced when an operation speed of the operation member is higher than a predetermined operation speed; and if the operation speed is reduced thereafter, then the reduced ratio is maintained.

According to the steering apparatus, the ratio of the wheel turning angle of the steered wheel to the operation amount of the operation member is reduced when the operation speed of the operation member by a driver is high; therefore, it is possible to suppress lowering the followability of the steering control in a high operation speed, and thereby improving the operation feeling. Furthermore, if the operation speed is reduced thereafter, then the reduced ratio is maintained; therefore, it is possible to prevent suddenly increasing the wheel turning angle when the operation speed is reduced. Accordingly, it is possible to cause uncomfortableness to the driver, and thereby further improving the operation feeling.

The reduced ratio may be continuously maintained until the operation amount of the operation member is reduced to a predetermined operation amount.

In this case, the end of maintaining the ratio can be set, and the ratio can be recovered after passing the end.

The steering apparatus may be provided with: a vehicle speed measuring device which measures a vehicle speed of a present vehicle in which the steering apparatus is mounted; a steering angle measuring device which measures a steering angle of the operation member, the steering angle being the operation amount; a wheel-turning driving device which turns the steered wheel; and a controller which controls the wheel-turning driving device, wherein the controller sets the ratio in response to the vehicle speed, as a normal ratio; if the vehicle speed is higher than a predetermined vehicle speed, or if the vehicle speed is lower than the predetermined vehicle speed and an absolute value of the steering angle is equal to or less than a predetermined steering angle, then controls the wheel-turning driving device based on the normal ratio; and if the vehicle speed is equal to or lower than the predetermined vehicle speed and the absolute value of the steering angle is larger than the predetermined steering angle, then controls the wheel-turning driving device based on the reduced ratio that is lower than the normal ratio.

The steering apparatus may be a steer-by-wire apparatus in which the operation member and a steering unit that turns the steered wheel, are mechanically unconnected.

The steering apparatus may be constructed such that the operation member and a steering unit that turns the steered wheel, are mechanically connected via planetary gears.

The planetary gears may be provided with a driving power assisting device that applies a steering power assisting torque to the steered wheel.

DETAILED DESCRIPTION OF THE INVENTION

Embodiments of a steering apparatus according to the present invention will be explained below with reference to FIGS. 1 to 5. Moreover, the embodiments show an example of applying the present invention to a steering apparatus of a vehicle.

Figure 1:
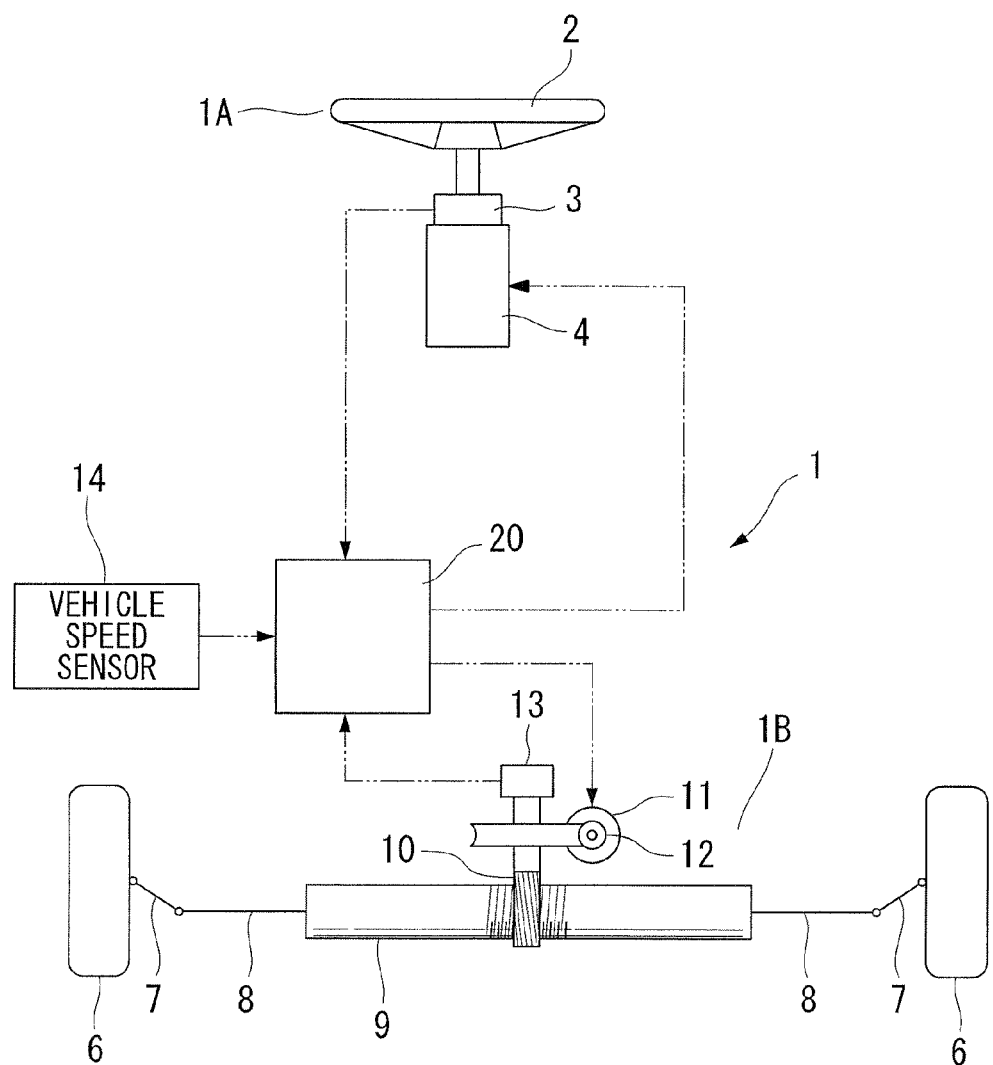
FIG. 1 is a construction view of one embodiment of a steering apparatus according to the present invention.

As shown in FIG. 1, a steering apparatus 1 of the present embodiment is a steering apparatus of steer-by-wire type in which an operation unit 1A that is operated by a driver and a steering unit 1B that turns steered wheels 6 are mechanically unconnected.

The operation unit 1A is provided with: a handle 2 (operation member) that is operated by the driver; a steering angle sensor 3 (input operation amount measuring device) that measures the steering angle (input operation amount) of the handle 2; and a reaction force motor 4 that applies reaction force to steering operation by the handle 2.

On the other hand, the steering unit 1B is provided with: a rack shaft 9 connected via knuckle arms 7 and tie rods 8 to left and right steered wheels 6 (steering steered wheel); a pinion shaft 10 having a pinion that meshes with a rack of the rack shaft 9; a wheels-turning motor 11; a worm gear 12 provided between the pinion shaft 10 and the wheels-turning motor 11; and a pinion angle sensor 13 which measures a rotational angle of the pinion shaft 10. In this steering unit 1B, the rack shaft 9 is moved in the axial direction thereof by activating the wheels-turning motor 11, and thereby turning the steered wheels 6.

In addition, the vehicle is provided with an electric controller 20. The electric controller 20 is input with outputs from the steering angle sensor 3 and the pinion angle sensor 13, and output from a vehicle speed sensor 14 that measures the vehicle speed of the present vehicle. The electric controller 20 controls the wheels-turning motor 11 and the reaction force motor 4 based on inputs from these sensors and the like.

Figure 2:
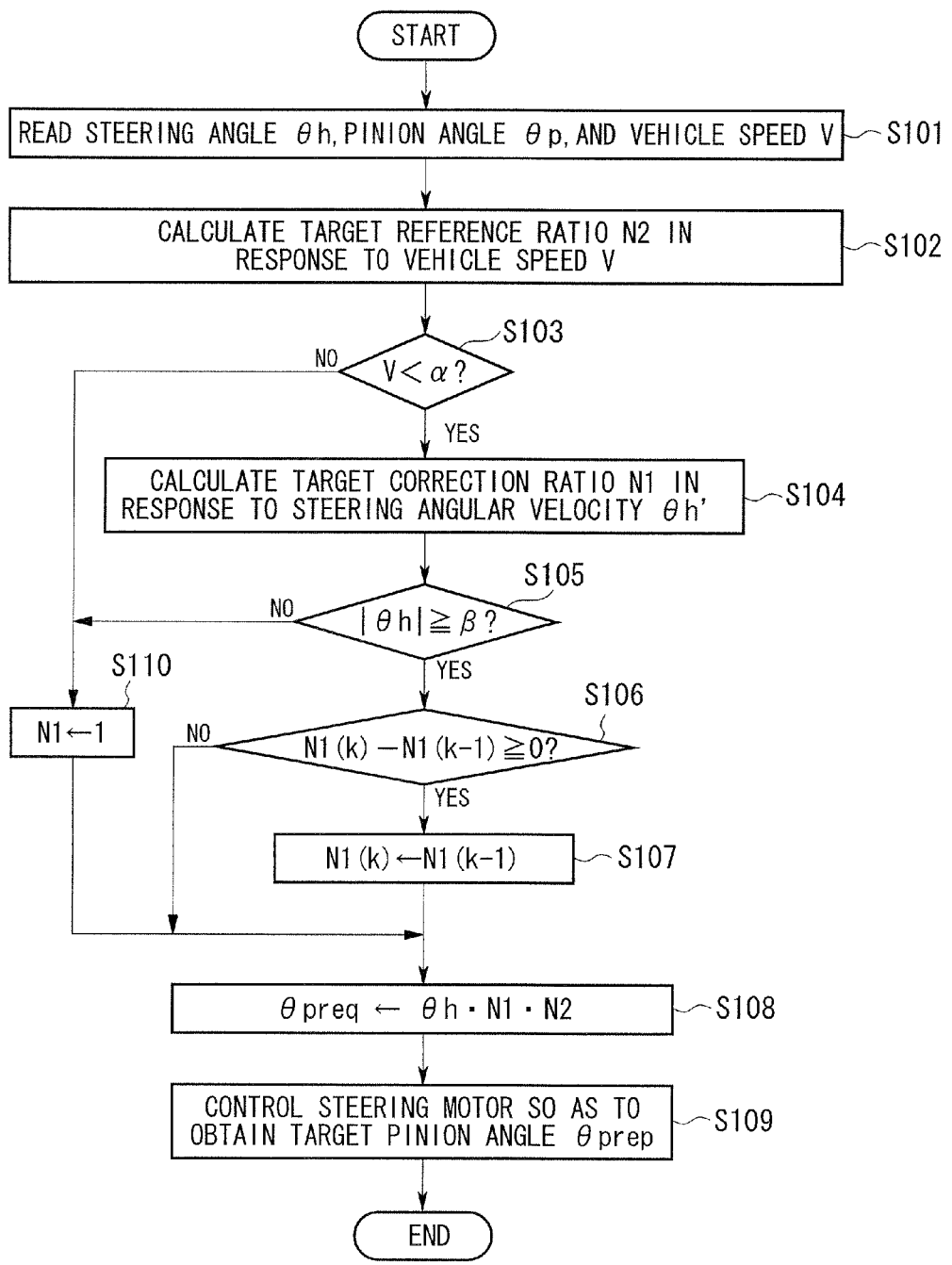
FIG. 2 is a flowchart showing a wheel turning angle control of the embodiment.

Next, a wheel turning angle control by the steering apparatus 1 will be explained below with reference to the flowchart of FIG. 2. The wheel turning angle control routine shown in the flowchart of FIG. 2 is repeated for every time interval by the electric controller 20.

Firstly, in step S101, steering angle θh measured by the steering angle sensor 3, pinion angle θp measured by the pinion angle sensor 13, and vehicle speed V measured by the vehicle speed sensor 14, are read.

Figure 3:
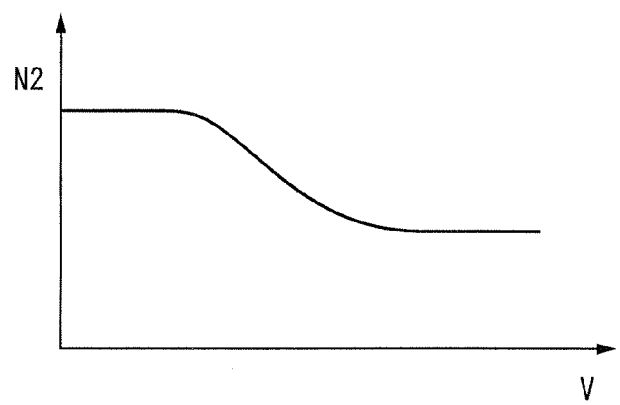
FIG. 3 is an example of a reference ratio map employed in the embodiment.

Next, the process proceeds to step S102, and calculates target reference ratio N2 corresponding to the vehicle speed V with reference to a reference ratio map as shown for example in FIG. 3. Moreover, the reference ratio map is set such that the target reference ratio N2 becomes smaller as the vehicle speed V becomes larger.

Next, the process proceeds to step S103, and it is determined whether the vehicle speed V is lower than a predetermined vehicle speed α (40 km/hr, for example). In the present embodiment, it is determined whether the wheels-turning motor 11 needs to output large driving force or not based on the determination result whether the vehicle speed V is lower than the predetermined vehicle speed α or not. Moreover, this vehicle speed determination in step S103 may be ineffective by setting the predetermined vehicle speed α to the maximum speed of the vehicle.

Figure 4:
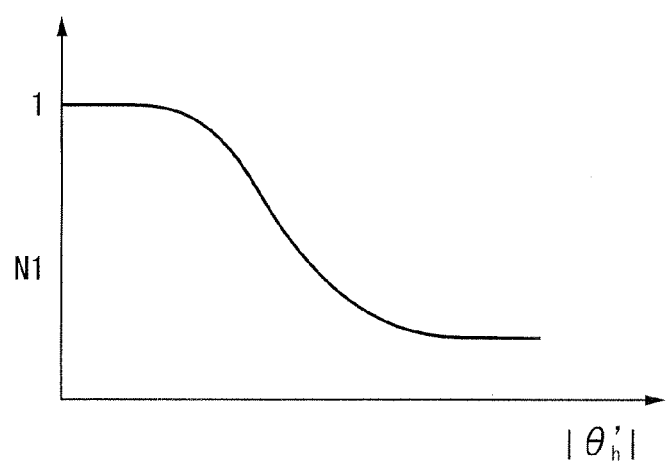
FIG. 4 is an example of a correction ratio map employed in the embodiment.

If the determination result in step S103 is "YES" (V<α), then the process proceeds to step S104, and calculates target correction ratio N1 in accordance with the absolute value of the steering angle speed θh', with reference to a correction ratio map shown in for example FIG. 4. Moreover, the steering angle speed θh' can be calculated by performing temporal differentiation of the steering angle θh. The correction ratio map is set such that: the correction ratio N1 becomes "1" when the steering angle speed θh' is zero; and the target correction ratio N1 decreases as the absolute value of the steering angle speed θh' increases.

Subsequently, the process proceeds to step S105, and it is determined whether the absolute value of the steering angle θh is equal to or larger than a predetermined value β (five-degrees, for example).

If the determination result in step S105 is "YES" (i.e., |θh|≧β), then the process proceeds to step S106. In this step S106, it is determined whether a target correction ratio difference ΔN1 that is obtained by subtracting a target correction ratio at the previous value of N1(k−1) from a target correction ratio at the current value of N1(k) is equal to or larger than zero (ΔN1=N1(k)−N1(k−1)≧0). That is, it is determined whether the target correction ratio at the current value of N1(k) is equal to or is larger than the target correction ratio at the previous value of N1(k−1). In other words, it is determined whether the absolute value of the steering angle speed θh' is equal to or less than the previous value. Moreover, the previous value of the target correction ratio corresponds to the target correction ratio N1 that was finally set by executing the routine at the previous time.

If the determination result in step S106 is "YES" (ΔN1≧0), then the process proceeds to step S107. In step S107, the previous value of N1(k−1) is set as the current value N1(k), and the process proceeds to step S108. That is, if the steering angle speed θh' is equal to or less than that of the previous value, then the target correction ratio N1 is not increased and the N1(k−1) is maintained.

On the other hand, if the determination result in step S106 is "NO" (ΔN1<0), then the process proceeds to step S108 without executing the process of step S107. That is, if the steering angle speed θh' is increased, then the target correction ratio N1 calculated in step S104 is set as the current value N1(k).

In step S108, a target pinion angle θpreq is calculated by multiplying the target reference ratio N2 and the target correction ratio N1 with steering angle θh (i.e., θpreq= θh·N1·N2). At this time, an angle ratio (hereinafter "target angle ratio") R with respect to the steering angle θp can be obtained by R=θpreq/θh=N1·N2.

Next, the process proceeds to step S109. The wheels-turning motor 11 is controlled such that the pinion angle θp becomes the target pinion angle θpreq, and the process of the routine is temporarily terminated.

On the other hand, when the determination result in step S103 is "NO" (V≧α) or when the determination result in step S105 is "NO" (|θh|<β), the process proceeds to step S110, the correction ratio N1 is set to "1" which is an initial value, and the process proceeds to step S108.

As has been explained in the above, in the steering apparatus 1 according to the present embodiment, the target correction ratio N1 is set to "1" in a vehicle speed region higher than the predetermined vehicle speed α; therefore, the target angle ratio R becomes R=N2, and becomes the same as the reference ratio N2 that is set only by the vehicle speed. Moreover, in the following explanation, the target angle ratio R that is same as the reference ratio N2 that is set only by the vehicle speed is called as the target angle ratio at the normal state.

In addition, also in a vehicle speed range where the vehicle speed is equal to or less than the predetermined vehicle speed α, and in a steering angle region where the absolute value of the steering angle θh is less than the predetermined value β, the target correction ratio N1 is set to "1"; therefore, the target angle ratio R becomes R=N2, and is set to the target angle ratio at the normal state.

That is, when the vehicle speed V is not low (i.e., when the wheels-turning motor 11 does not need to generate larger output power), or when the steering angle θh is small even though the vehicle speed V is low, the target angle ratio R needs not be smaller. Therefore, the target correction ratio N1 is set to "1", and the target angle ratio is set to the target angle ratio R at the normal state (R=N2).

Then, when the vehicle speed is in the vehicle speed range where the vehicle speed is equal to or less than the predetermined vehicle speed α, if the steering angle is in the steering angle range where the absolute value of the steering angle θh is larger than the predetermined value β, then the target correction ratio N1 is set to the value smaller than "1" in accordance with the absolute value of the steering angle speed θh', and the target angle ratio R is set to the value smaller than the target angle ratio at the normal state (R<N2). Accordingly, for example, while turning wheels when the vehicle is stopped, it is possible to suppress deteriorating the followability of the handling, and thereby improving the operation feeling.

Furthermore, the target correction ratio N1 is set to the smaller value as the absolute value of the steering angle speed θh' becomes larger, and the target angle ratio R is set to a small value; therefore, it is possible to suppress deteriorating the followability of the handling even when the handle 2 is quickly turned.

In addition, when the absolute value of the steering angle speed θh' is same as or is reduced from the previous value, the target correction ratio N1 is not increased and is maintained to the previous value. Accordingly, since the target angle ratio R is maintained without being increased, it is possible to prevent causing uncomfortableness to a driver due to sudden increase in the wheel turning angles of the steered wheels 6 when the driver reduced the steering operation speed of the handle 2. Accordingly, the operation feeling can be improved. While the absolute value of the steering angle speed θh' is equal to or less than the previous value, maintaining the target correction ratio N1 to the previous value continues until the absolute value of the steering angle θh in step S105 becomes smaller than the absolute value of the predetermined value β.

Moreover, the present invention is not limited only to the above-mentioned embodiment.

For example, in step S103 of the above-mentioned embodiment, it is determined whether the wheels-turning motor 11 needs to output larger output power, based on the vehicle speed; however, instead of this, it may be arranged such that (i) the value of the current to be supplied to the wheels-turning motor 11 is measured, and (ii) it is determined whether the wheels-turning motor 11 needs to output larger output power, based on the measured value of the current. In this case, it is determined in step S103 whether the value of the current i supplied to the wheels-turning motor 11 is larger than the predetermined value γ; and if the determination result is "YES" (i>γ), then the process proceeds to step S104 while if the determination result is "NO" (i≦γ), then the process proceeds to step S110.

In addition, in the above embodiment, the target pinion angle θpreq is calculated and the wheels-turning motor 11 is controlled such that the pinion angle θp becomes the target pinion angle θpreq; however, since there is an interrelationship between the pinion angle θp and the amount of movement of the rack, it may be arranged such that (i) a target rack moving amount in relation to the target pinion angle θpreq is calculated, and (ii) the wheels-turning motor 11 is controlled such that the actual rack moving amount reaches the target rack moving amount.

Figure 5:
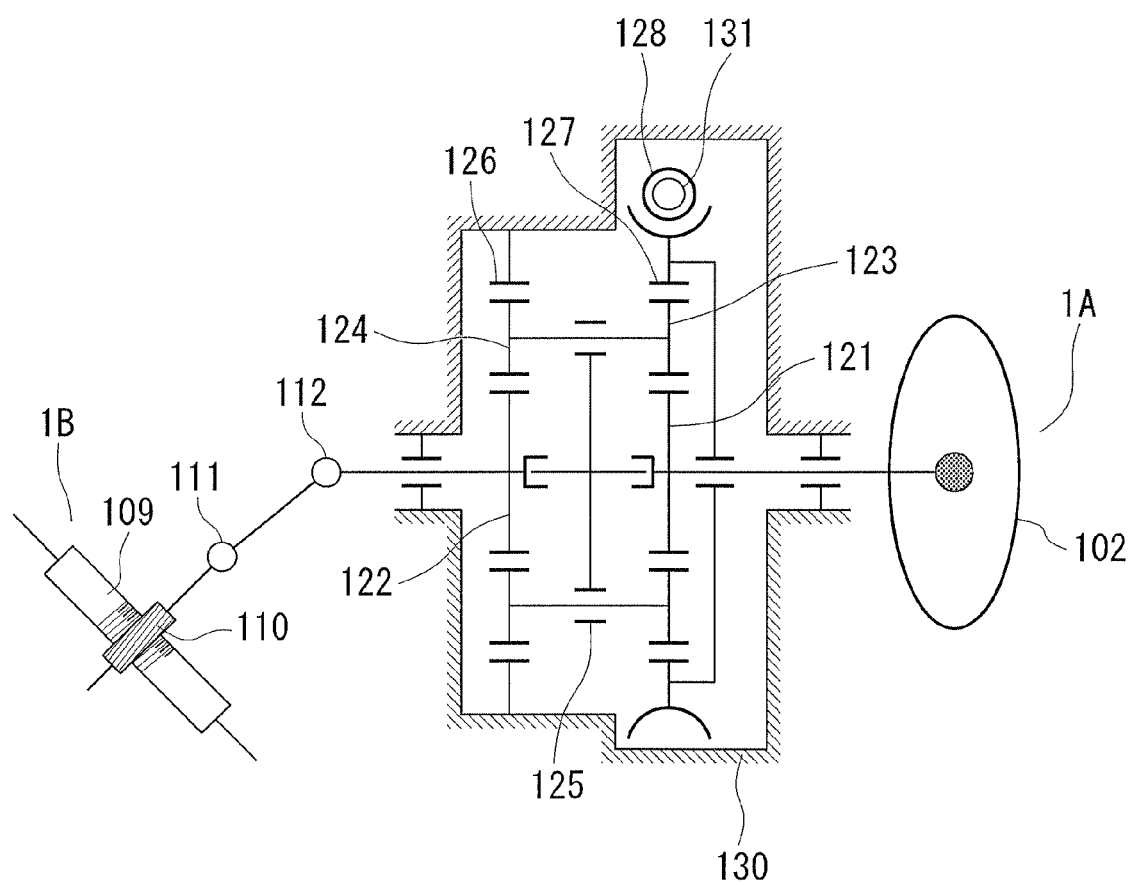
FIG. 5 is a construction view of another embodiment of a steering apparatus according to the present invention.

Furthermore, the above-mentioned embodiment shows an example of applying the present invention to a steering apparatus of a steer-by-wire steering apparatus; however, as shown in FIG. 5, the present invention is also applicable to a steering apparatus 100 in which an operation unit 1A to be operated by a driver and a steering unit 1B which turns an operation unit 1A and steered wheels, are mechanically connected via planetary gears.

Construction of the steering apparatus 100 will be briefly explained below. The construction is formed such that: a handle 102 of the operation unit 1A is connected to a first sun gear 121; a pinion shaft 110 that meshes with a rack shaft 109 of a steering unit 1B is connected to a second sun gear 122 via universal joints 111 and 112; a first pinion gear 123 that meshes with an external gear of the first sun gear 121 and a second pinion gear 124 that meshes with an external gear of a second sun gear 122 are unitarily connected, and are rotationally supported by a career 125; a second link gear 126 having an internal gear that meshes with the second pinion gear 124 is fixed to a steering column 130; a first link gear 127 having an internal gear that meshes with the first pinion gear 123 is rotationally supported in relation to the first sun gear 121 and a steering column 130; and a worm gear 128 that meshes with an external gear of the first link gear 127 can be driven by a steering ratio changeable motor 131. Moreover, in FIG. 5, only the output axis of the steering ratio changeable motor 131 is illustrated.

In this steering apparatus 100, it is possible to change a rotational angle ratio between the first sun gear 121 and the second sun gear 122 (i.e., it is possible to change the angle ratio of a rotational angle of the pinion shaft 110 to the handle 102), by controlling the steering ratio changeable motor 131 to control rotations of the first link gear 127.

Furthermore, also in this steering apparatus 100, through the same processes as those of the above-mentioned steer-by-wire type, it is possible to obtain the same operations and the same advantageous effects as those of the above embodiment by: calculating the target pinion angle θpreq of the pinion shaft 110 in relation to the steering angle θh of the handle 102; and controlling the steering ratio changeable motor 131 such that the actual pinion angle reaches the target pinion angle θpreq.

Furthermore, the present invention is also applicable to a construction having a power-assisting motor that provides a steering power assisting torque to the pinion shaft 110 of the steering apparatus 100. In this case, it is possible to suppress deteriorating the steering followability in the vehicle speed range where the vehicle speed is equal to or lower than the predetermined vehicle speed α and in the steering angle range where the absolute value of the steering angle θh is larger than the predetermined value β; therefore, it is possible to suppress causing delay in the steering assistance by the power-assisting motor, and it is thereby possible to suppress increasing an operation load onto a driver.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A steering apparatus which is capable of changing and controlling a ratio of a turning angle of a steered wheel to an operation amount of an operation member, wherein
   the ratio is reduced when an operation speed of the operation member is higher than a predetermined operation speed; and
   if the operation speed is reduced thereafter, then the reduced ratio is maintained.

2. The steering apparatus according to claim 1, wherein
   the reduced ratio is continuously maintained until the operation amount of the operation member is reduced to a predetermined operation amount.

3. The steering apparatus according to claim 1, comprising:
   a vehicle speed measuring device which measures a vehicle speed of a present vehicle in which the steering apparatus is mounted;
   a steering angle measuring device which measures a steering angle of the operation member, the steering angle being the operation amount;

a wheel-turning driving device which turns the steered wheel; and a controller which controls the wheel-turning driving device, wherein the controller sets the ratio in response to the vehicle speed, as a normal ratio;

if the vehicle speed is higher than a predetermined vehicle speed, or if the vehicle speed is lower than the predetermined vehicle speed and an absolute value of the steering angle is equal to or less than a predetermined steering angle, then controls the wheel-turning driving device based on the normal ratio; and if the vehicle speed is equal to or lower than the predetermined vehicle speed and the absolute value of the steering angle is larger than the predetermined steering angle, then controls the wheel-turning driving device based on the reduced ratio that is lower than the normal ratio.

4. The steering apparatus according to claim 1, is a steer-by-wire apparatus in which the operation member and a steering unit that turns the steered wheel, are mechanically unconnected.

5. The steering apparatus according to claim 1, wherein the operation member and a steering unit that turns the steered wheel, are mechanically connected via planetary gears.

6. The steering apparatus according to claim 5, wherein the planetary gears is provided with a driving power assisting device that applies a steering power assisting torque to the steered wheel.

* * * * *

UNITED STATES PATENT AND TRADEMARK OFFICE
CERTIFICATE OF CORRECTION

PATENT NO.         : 8,046,133 B2
APPLICATION NO.    : 12/026270
DATED              : October 25, 2011
INVENTOR(S)        : Yoshimitsu Akuta et al.

It is certified that error appears in the above-identified patent and that said Letters Patent is hereby corrected as shown below:

Title Page

Item (75), Inventors, please correct the inventors' information to read as follows:
-- Yoshimitsu Akuta, Shimotsuke-shi (JP); Shunsuke Watanabe, Utsunomiya-shi (JP) --.

Signed and Sealed this
Twenty-seventh Day of March, 2012

David J. Kappos
*Director of the United States Patent and Trademark Office*